United States Patent [19]

Zeligson

[11] Patent Number: 5,010,668
[45] Date of Patent: Apr. 30, 1991

[54] ADVERTISING DEVICE FOR AIRLINER SEAT BACK OR SNACK TRAY TABLE

[76] Inventor: Stephen J. Zeligson, 1815 E. 31st Pl., Tulsa County, Okla. 74105

[21] Appl. No.: 317,024

[22] Filed: Feb. 28, 1989

[51] Int. Cl.$^5$ .............................................. G09F 3/00
[52] U.S. Cl. ........................................ 40/324; 40/320
[58] Field of Search ................ 40/324, 320, 649, 661, 40/611

[56]  References Cited

U.S. PATENT DOCUMENTS

| 1,394,881 | 10/1921 | Bardera | 40/320 |
| 1,566,412 | 12/1925 | Lovinger | 40/324 X |
| 2,131,586 | 9/1938 | Dano | 40/320 |
| 2,517,433 | 8/1950 | Hoven et al. | 40/320 X |
| 2,770,903 | 11/1956 | Schmidt | 40/320 |
| 4,640,033 | 2/1987 | Bulger | 40/324 |

FOREIGN PATENT DOCUMENTS 2276649  1/1976  France .................................. 40/320

Primary Examiner—Laurie K. Cranmer
Attorney, Agent, or Firm—Head & Johnson

[57] ABSTRACT

An improvement in airliner seat backs and snack tray tables facilitates the display of replaceable printed or pictorial materials for viewing by passengers seated rearwardly of the display. The materials are displayed through a transparent window pane overlaping the interior perimeter of a window in the rear portion of the seat back or the top or bottom sides of the table. The printed or pictorial materials are releasably held in face-to-face relationship with the window pane by various means depending on the structure of the seat back or table. The improvement is adapted to existing tray tables by use of a thin resiliently flexible member fitted to the contours of the tray table and releasably snappable to the table with the printed or pictorial materials in place.

14 Claims, 3 Drawing Sheets

ADVERTISING DEVICE FOR AIRLINER SEAT BACK OR SNACK TRAY TABLE

BACKGROUND OF THE INVENTION

This invention relates generally to the display of advertising materials and more particularly concerns the display of advertising materials on airliner seat backs or snack tray tables. Given the present competitive economic climate in commercial air fares, airlines are or will be seeking new sources of revenue to enhance the competitiveness of their ticket prices. At the same time, with the advent of cable television, large captive audiences that were limited to major network television no longer exist. Consequently, the advertising industry is or will be more diligently than ever seeking identifiable segmented audiences for presentation of materials to accomplish its client's objectives. Profiles of typical air travelers are relatively easily developed based on such information as points of origin and destination, class of seating, days of the week, seasons of the year, smoking or non-smoking, and so forth. A marriage between the airlines and advertising industries for their mutual benefit therefore presents a high expectation of success.

The concept of advertising in various modes of transportation other than air travel is well known. Devices have been developed for use in the display of advertising on buses, taxi cabs and trains. But little if anything has been done to facilitate the tasteful and pleasant presentation of advertising within the confines of the interior of an airliner.

Accordingly, it is a primary aim of this invention to facilitate the display of advertising in an airliner cabin. Moreover, it is an objective of this invention to do so in a tasteful, pleasant, unobtrusive manner. It is also an object of this invention to facilitate the easy replacement of such materials. It is therefore an object of this invention to facilitate the display of printed and pictorial materials on airliner seat backs and snack tray tables. Additionally, it is an object of this invention to facilitate the blending of the apparatus used to display the materials with the airliner seat back or snack tray table by molding or otherwise conforming the apparatus to the configuration of the seat back or snack tray table and by the use of the same materials used or materials compatible with the materials used in the structure of the seat back or snack tray table.

SUMMARY OF THE INVENTION

In accordance with the invention, an improvement in airliner passenger seats is provided. A window in the seat back or tray table is fitted with a window pane to permit viewing of printed or pictorial materials displayed in the window to a passenger seated rearwardly of the displaying window. Access is provided to the space behind the viewing window for the easy replacement of the printed or pictorial materials. The invention also contemplates the fitting of a viewing window pane over existing airliner snack tray tables.

BRIEF DESCRIPTION OF THE DRAWINGS

Other objects and advantages of the invention will become apparent upon reading the following description and upon reference to the drawings, in which.

While the invention will be described in connection with the preferred embodiment, it will be understood that it is not intended to limit the invention to that embodiment. On the contrary, it is intended to cover all alternatives, modifications and equivalents, as may be included within the spirit and scope of the invention as defined by the appended claims.

DETAILED DESCRIPTION OF THE INVENTION

Figure 2:
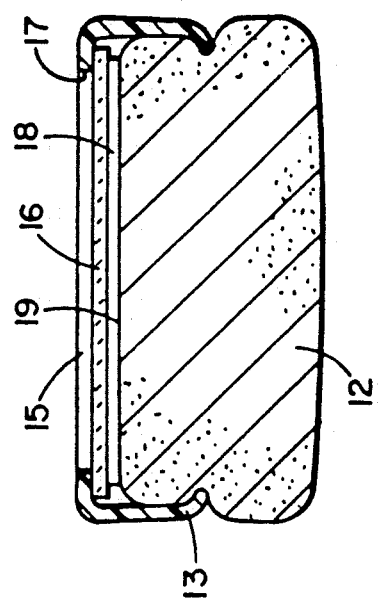
FIG. 2 is a cross-section of the airliner passenger seat shown in FIG. 1 taken along the line 2—2.
Figure 3:
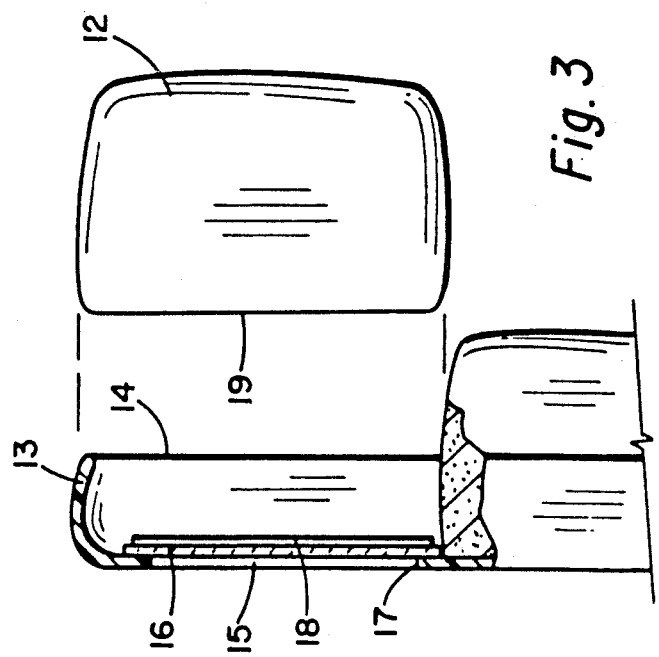
FIG. 3 is a cross-section of the airliner passenger seat shown in FIG. 1 taken along the line 3—3 and further illustrating a removable pillow embodiment of the improvement in the airliner passenger seat.
Figure 1:
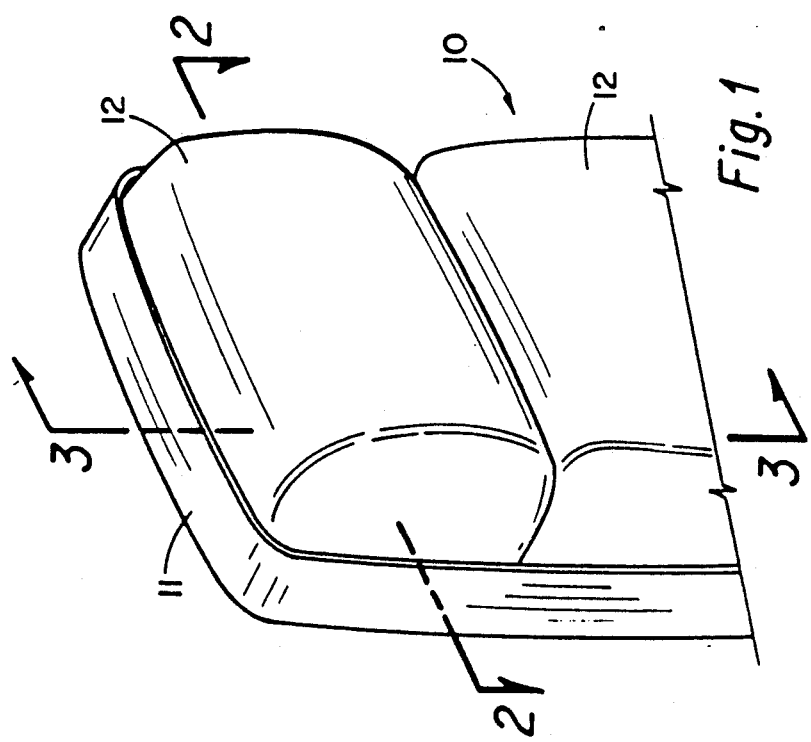
FIG. 1 is a front perspective view of the upper portion of a typical airliner passenger seat.

Turning to FIG. 1, there is illustrated the upper portion of a typical airliner seat 10 which consists of a rigid back or support member or frame 11 having one or more cushions 12 mounted in the seat back. As shown in FIGS. 2 and 3, the seat back 11 is modified along its forward perimeter by the inward extension of a lip 13 which restricts the size of the forward opening 14 in the seat back 11. Consequently, a cushion 12 snuggled into the seat back will be compressed and gripped by the lip 13 so that the cushion 12 may be removably held in place. The seat back 11 is provided with a window 15. A transparent window pane 16 is shaped to overlap the perimeter 17 of the window 15. The window pane 16 may be secured in place over the window 15 in any suitable fashion, such as by the use of an adhesive, or may rest in a seat provided in the seat back as is hereinafter described in relation to other embodiments of the invention. Advertising material or any form of printed or pictorial material 18 rests against the interior face of the transparent window pane 16. With the material in this position, the cushion 12 may be fully inserted into the forward opening 14 of the seat back frame 11 until the rear portion 19 of the cushion 12 secures the printed or pictorial material 18 against the rear surface of the transparent window pane 16. If the cushions 12 are of insufficient depth to secure the printed or pictorial materials 18 in place, a filler (not shown) may be used between the window pane 16 and the cushion 12 to accomplish the purpose.

Figures 4, 5:
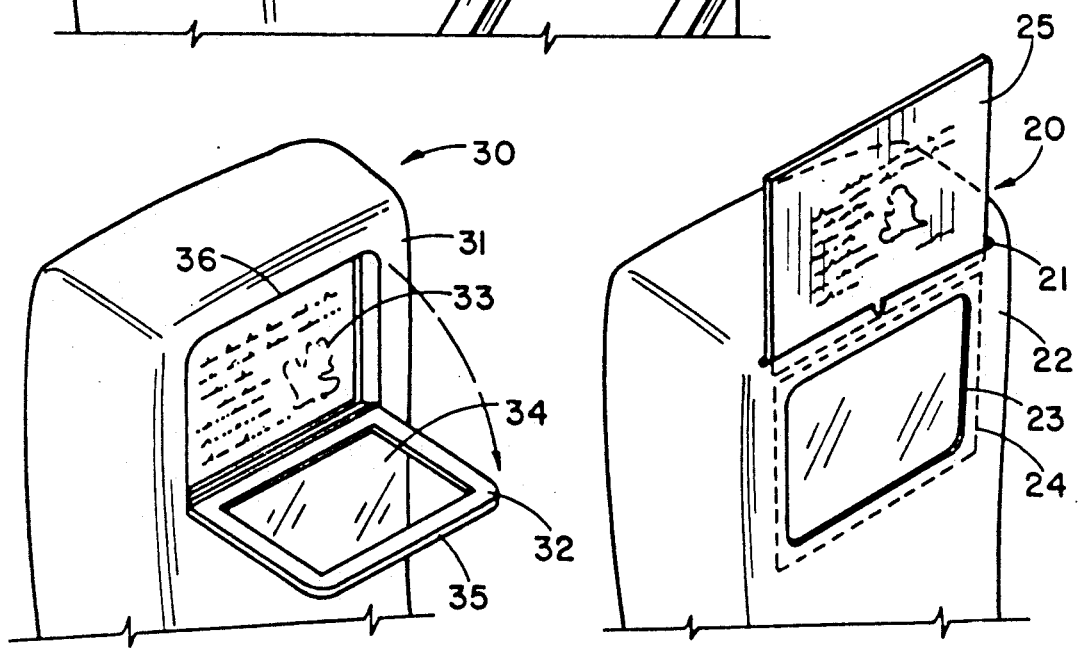
FIG. 4 is a rear perspective view of an airliner passenger seat illustrating a slot embodiment of the improvement in the seat back.
FIG. 5 is a rear perspective view of an airliner passenger seat illustrating a hingedown embodiment of the improvement in the seat back.

Alternative means for gaining access for the insertion or removal of printed or pictorial materials 16 in laminar disposition on the interior surface of the transparent window pane 16 may also be employed. For example, as shown in FIG. 4, the airliner seat 20 may be provided with a slot 21 through its back frame 22, the slot 21 extending along a portion of the window perimeter 23 but beyond or outside the periphery of the transparent window pane 24. Thus the printed or pictorial material 25 may be removably inserted through the slot 21 into or out of position on the interior face of the transparent window pane 24.

Alternatively, as shown in FIG. 5, the airliner seat 30 may include a seat back frame 31 having a detached portion 32 hinged to the seat back 31. Thus, the printed or pictorial material 33 may be removably placed within the seat back against the seat cushion or filler (not shown). With the material in place, the detached portion 32 can be closed to secure the printed or pictorial material 33 against the transparent window pane 34. The detached portion 32 may be held in place in the seat back 31 by the frictional bond provided between the edge 35 of the detached portion 32 and the edge 36 of the seat back frame 31. Alternatively, a retainer (not shown) could be mounted on the seat back to fasten the detached portion 35 in the closed position.

Figure 6:
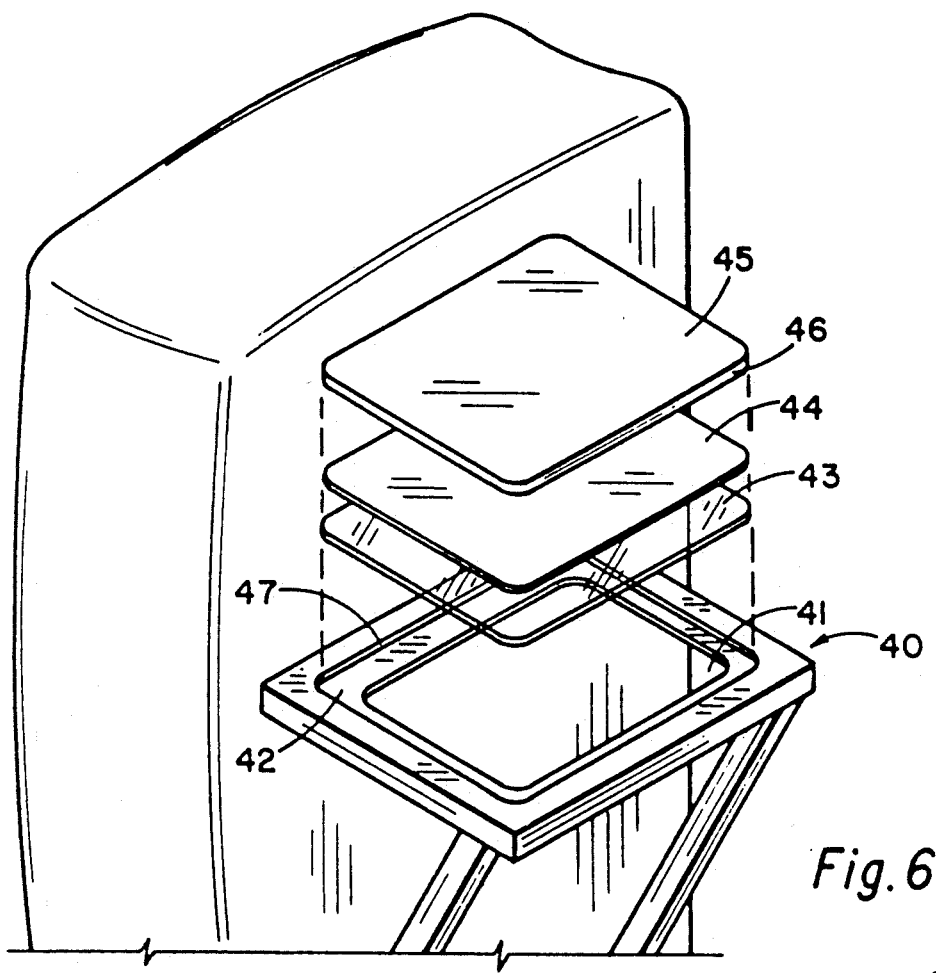
FIG. 6 is a rear perspective view of an airliner seat back and tray table illustrating a removable table top improvement in the tray table.

As shown in FIG. 6, display of the printed or pictorial materials may also be accomplished by use of the tray table 40 employed with most airliner seats. As shown, a window 41 is provided in the bottom of the tray table 40 and seat 42 is provided around the perimeter of the window 41. A transparent window pane 43 is shaped to sit within the seat 42. The printed or pictorial material 44 may then be rested on the surface of the transparent window pane 43. The table top 45 is also shaped to fit within the seat 42 over the printed material 44, securing the printed or pictorial material 44 in position against the transparent window pane 43. The table top 45 may be releasably secured within the seat 42 by any suitable means such as by a frictional bond between the edges 46 of the top and the edges 47 of the seat 42.

Figure 7:
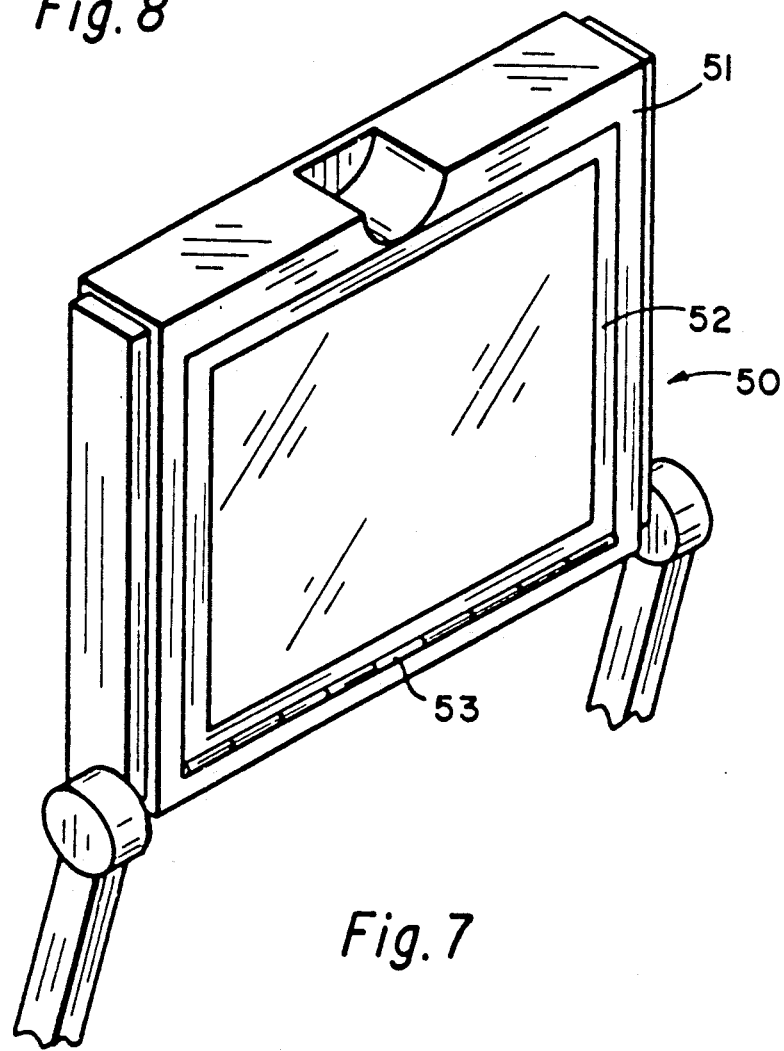
FIG. 7 is a rear perspective view of an airliner seat tray table illustrating a table bottom hinge embodiment of the improvement in the tray table.

Alternatively, the airliner seat tray table 50 may be improved as is illustrated in FIG. 7. In this arrangement the tray table frame 51 has a detached portion 52 mounted to the frame 51 on a hinge 53 allowing the bottom of the tray table 50 to open and close in a similar fashion to the detached seat back arrangement shown in FIG. 5. This arrangement could of course be reversed to allow for hinged access from the top of the tray table could be modified by the inclusion of a slot in one side of the table to permit the insertion and removal of pictorial or printed materials in place against a transparent window pane provided in the bottom of the tray table.

Figure 8:
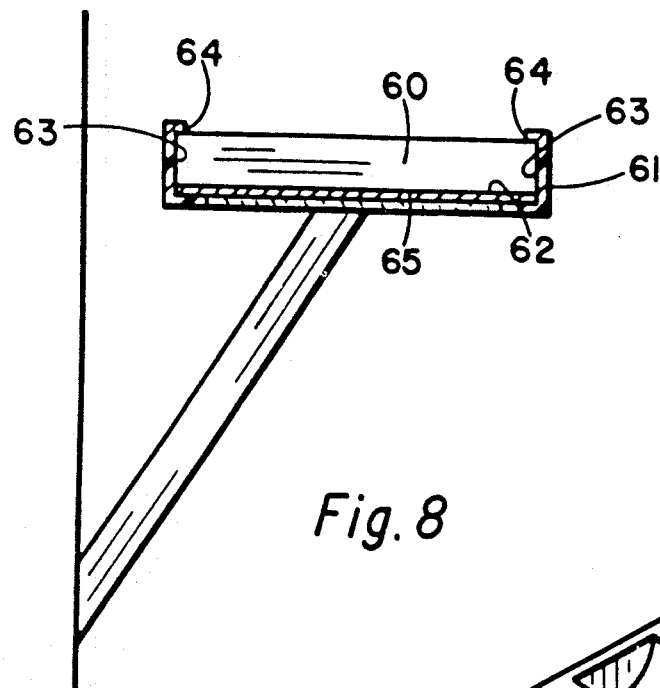
FIG. 8 is a vertical cross-section of a tray table used with an airliner passenger seat illustrating a snap-on embodiment of the improvement to the tray table.

In order to accomplish the purpose of the invention with respect to an existing tray table 60, as illustrated in FIG. 8, a flat member 61 fitted to the contour of the bottom 62 of the table 60 and substantially opposing portions of the sides 63 and top 64 of the table 60 is provided. The member 61 is molded or formed from a resiliently flexible material so that the member 61 may be removably snapped into position around the tray table 60. If the member 61 is made of a transparent material, then the printed or pictorial material 65 may simply be disposed in laminar relationship between the member 61 and the bottom surface of the table 60, as is shown in FIG. 8. If, however, the member is to be opaque, then, as has been hereinbefore illustrated, the member 61 may be provided with a window and transparent window pane to permit viewing of the printed or pictorial material.

With respect to any of the tray table embodiments, the viewing window may be a part of the top of the tray table rather than the bottom to permit viewing when the table is in the down or open position, or top and bottom viewing windows may be used in combination.

It is contemplated that the transparent material used in the various embodiments of this invention would be Lucite ®, but any clear plastic, glass, or other transparent material could be used. It is further contemplated that the opaque portions of the improvements to the seat back or tray tables would be molded or formed from the same materials or compatible material as the seat back or tray tables and that the improvements would further be molded or formed to blend into the contours of the seat backs or tray table.

It is apparent that there has been provided, in accordance with the invention, an improvement in airliner seat backs and tray tables that fully satisfies the objects, aims and advantages set forth above.

While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit of the appended claims.

What is claimed is:

1. In airliner passenger seats having cushions supported by a seat back having a continuous smooth-flowing gradual contour along substantially the entire back surface thereof, an improvement facilitating the display of replaceable printed or pictorial materials for viewing by passengers seated rearwardly of the displaying seat comprising:

a window having a perimeter disposed in and conforming to said contour of said seat back;

a transparent window pane shaped to overlap said perimeter of said window;

means for securing said pane to the interior of said seat back with said window pane disposed to conform to said contour of said seatback in overlapping relationship to said perimeter;

means permitting the removable insertion of said printed or pictorial materials in face-to-face relationship with said pane; and means for holding said printed or pictorial materials in said face-to-face relationship.

2. The improvement according to claim 1, said securing means comprising a seat disposed in the interior surface of said seat back along said window perimeter, said seat being shaped to receive said window pane therein.

3. The improvement according to claim 1, said seatback having a forward perimeter defining a seatback opening and said permitting means comprising a lip disposed along said forward perimeter of said seat back and restricting said seat back opening for removably gripping a seat cushion snuggled therein.

4. The improvement according to claim 1, said holding means comprising a compressible cushion of sufficient depth to press said materials against said pane when said cushion is mounted on said seat back.

5. The improvement according to claim 1, said permitting means comprising a slot disposed through said seat back proximate a portion of said window perimeter and outside the periphery of said pane.

6. The improvement according to claim 1, the portion of said seat back to which said pane is secured being separable from said seat back and said permitting means comprising means connecting said separable portion to said seatback for movement relative to seatback and means for selectively locking said connected detached portion to said seat back.

7. The improvement according to claim 6, said connecting means comprising a hinge means connecting said portion to said seat back and said locking means comprising retaining means for releasably engaging an unhinged segment of said detached portion to said seat back.

8. In foldout tray tables used with airliner passenger seats, an improvement facilitating the display of replaceable printed and pictorial materials for viewing by passengers seated rearwardly of a closed tray table comprising:
- a table base having a window therethrough and having a seat disposed in its interior surface along the periphery of said window;
- a transparent window pane shaped to rest in said window seat;
- a table top shaped to removably rest within said window seat for holding said printed or pictorial materials in face-to-face relationship to said window pane; and
- means for releasably securing said table top within said window seat.

9. The improvement according to claim 8, said securing means comprising a frictional bond between the side edges of said window seat and said table top.

10. In foldout tray tables used with airline passenger seats, an improvement facilitating the display of replaceable printed or pictorial materials for viewing by passengers seated rearwardly of a closed tray table comprising:
- a table top;
- a table base having a window therethrough and having a seat disposed in its interior surface along the periphery of said window;
- a transparent window pane shaped to rest in said window seat;
- a hinge connecting said table top and said table base for articulation of said base and said window pane into and out of laminar relationship with said top; and
- means for releasably securing said top, said pane and said base in laminar relationship.

11. In foldout tray tables used with airliner passenger seats, an improvement facilitating the display of replaceable printed and pictorial materials for viewing by passengers seated at an open tray table comprising:
- a table top having a window therethrough;
- a transparent window pane shaped to overlap the perimeter of said window;
- a table base for holding said printed or pictorial materials in face-to-face relationship against said window pane and said window pane against said table top;
- means for releasably securing said table top, said window pane, said materials and said table base in laminar relationship.

12. In foldout tray tables used with airliner passenger seats, an improvement facilitating the display of replaceable printed or pictorial materials for viewing by passengers comprising:
- a tray table having two planar surfaces;
- means forming sides of said table tray for spacing said surfaces in substantially parallel planes;
- a window disposed in at least one of said surfaces;
- a transparent window pane overlapping the interior perimeter of said window; and
- access means disposed through one side of said tray table for removable insertion of materials against the interior surface of said transparent window pane.

13. In airliner passenger seats having cushions supported by a seatback, an improvement facilitating the display of replaceable printed or pictorial materials for viewing by passengers seated rearwardly of the displaying seat comprising:
- a detachable portion of said seatback;
- a window having a perimeter disposed in said detachable portion of said seatback;
- a transparent window pane shaped to overlap said perimeter of said window;
- means for securing said pane to an interior of said detachable portion of said seatback in overlapping relationship to said perimeter;
- a hinge connecting said detachable portion to said seatback;
- a retaining means for releasably engaging an unhinged segment of said detachable portion to said seatback; and
- means for holding said printed or pictorial materials in face-to-face relationship with said pane.

14. In airline passenger seats having cushions supported by a seatback, an improvement facilitating the display of replaceable printed or pictorial materials for viewing by passengers seated rearwardly of the displaying seat comprising:
- a window disposed in said seatback;
- a transparent window pane shaped to overlap the perimeter of said window;
- means for securing said pane to an interior of said seatback in overlapping relationship to said perimeter;
- means permitting the removable insertion of said printed or pictorial materials in face-to-face relationship with said pane; and
- a compressible cushion of sufficient depth to press said materials against said pane in a face-to-face relationship when said cushion is mounted in said seatback.

* * * * *